United States Patent [19]
Bradley

[11] 3,827,514
[45] Aug. 6, 1974

[54] WEIGHT MEASURING HOOK BLOCK APPARATUS FOR CRANES

[75] Inventor: Richard S. Bradley, Fairmont, Minn.

[73] Assignee: Weigh-Tronix, Inc., Armstrong, Iowa

[22] Filed: June 25, 1973

[21] Appl. No.: 373,487

[52] U.S. Cl............... 177/147, 177/211, 73/141 A
[51] Int. Cl...... G01g 19/14, G01g 3/14, G01l 5/12, B66c 1/40
[58] Field of Search .......... 177/147, 211; 73/141 A

[56] References Cited
UNITED STATES PATENTS

| | | | |
|---|---|---|---|
| 2,820,624 | 1/1958 | Koegel | 177/211 X |
| 3,080,935 | 3/1963 | Abbonizio et al. | 177/147 |
| 3,100,546 | 8/1963 | Cramwinckel | 177/147 X |
| 3,499,500 | 3/1970 | Harding | 177/211 X |
| 3,554,025 | 1/1971 | Andersson et al. | 177/211 X |

Primary Examiner—George H. Miller, Jr.
Attorney, Agent, or Firm—Williamson, Bains & Moore

[57] ABSTRACT

A weight measuring hook block apparatus for cranes attachable between the crane and the hook or other load engaging device and usable on already existing cranes or as original equipment on hereafter constructed cranes comprises a hook block frame member supporting the ends of a substantially straight longitudinal bar which is elastically deformable in response to loading forces applied to the bar. A force applying member is positioned on the bar between the ends thereof to transmit forces to the bar which are exerted on the force applying member. One of the members is carried by the crane, and the remaining member is arranged to carry the load engaging device so that a load applied to one of the members causes the remaining member to exert reaction force on the bar to deform the bar elastically. Strain gauge means operatively mounted on the bar detect deformation of the bar caused by these forces and provide a measurable response indicating the weight of the load carried by the load engaging device. Means are provided on the hook block frame member to transmit a radio signal to the crane cab, the radio signal including information informing the operator of the magnitude of the load.

22 Claims, 7 Drawing Figures

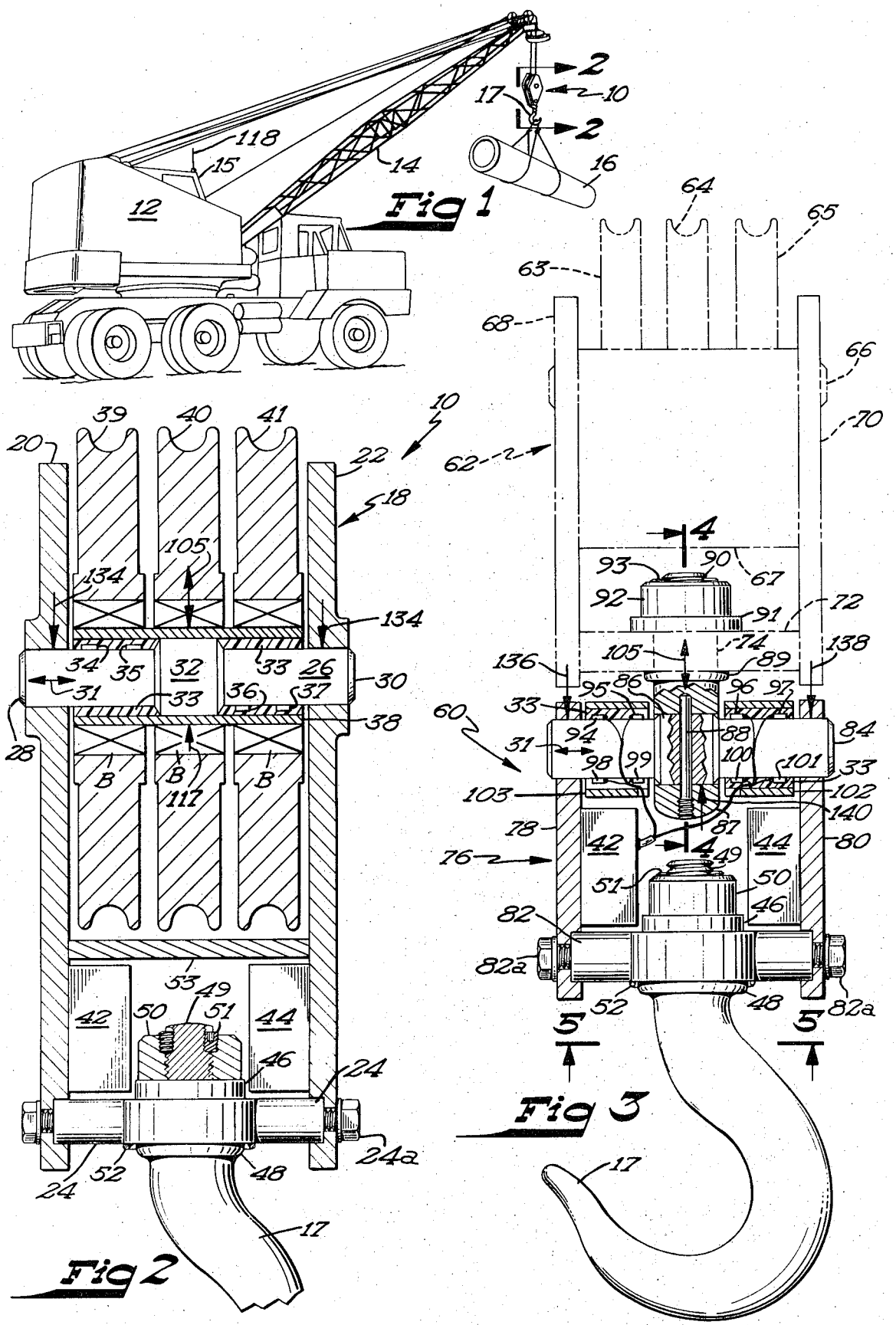

WEIGHT MEASURING HOOK BLOCK APPARATUS FOR CRANES

BACKGROUND OF THE INVENTION

In past years, crane operation has required constant alertness on the part of an operator to assure that the loads are not so heavy as to cause tipping of the crane or failure of its parts. Until recently, determination of the maximum load and boom angles which a crane will safely handle has often been largely a matter of operator discretion. Unfortunately, accurate estimation of load weight is often difficult, and the risk of the crane tipping, the attendant danger to nearby workers, and the chance of damage to equipment are ever present. With these problems in mind, newly enacted federal safety standards have required cranes to be provided with scales by which an applied load can be measured by an operator in the crane cab.

Commercially available scales utilize load cells of some type and have them mounted on or about the crane in three principal ways. Many scale systems are incorporated in the boom, in the pintles supporting the boom, or in the boom mast from which supporting cables extend to the chassis of the crane. A second mounting technique is to attach the load cell between the boom and the dead end of a supporting cable.

While installation of the load cell on the boom, the boom mast, or between the dead end of the cables and the boom has been adequate for load measurement, these techniques have the serious disadvantage of requiring custom installation for each crane which is expensive and time consuming. Since thousands of already produced cranes require installation of a load measuring system, these techniques are not well adapted to such cranes and an acceptable alternative is badly needed. The present invention provides an excellent solution to these problems.

A third mounting technique which up to the advent of the present invention has had only limited success is to mount the load cell on the hook block. The cranes incorporating this technique have been adequate only for lifting restricted loads and have had the serious disadvantage of requiring a hook block which is outlandishly oversize and cumbersome. A hook block of this type was difficult to work with and reduced the effective reach of the boom. These problems have been overcome by the present invention.

BRIEF SUMMARY OF THE INVENTION

The present invention relates to the field of load measuring scales for cranes, and provides an extremely reliable measuring scale which is relatively inexpensive to manufacture, quickly and easily installed on new and already existing cranes, and designed for loads of any size and weight without interfering with the reach of the crane boom or use of the hook block.

The invention utilizes a hook block frame member to support the ends of a substantially straight, longitudinal bar which is elastically deformable in response to loading forces applied to the bar. A force applying member is positioned on the bar between the ends thereof to transmit to the bar any forces which are applied to the force applying member. Either of the members may be carried by the crane, and the member not carried by the crane is constructed and arranged to carry a load engaging device such as a hook. The hook block frame member and the force applying member cooperate to elastically deform the bar as a load is applied. Strain gauge measuring means are operatively mounted on the bar to detect deformation of the bar as force is applied to it, thereby providing a measurable response indicating the weight of the load carried by the load engaging device.

The weight measuring hook block apparatus may be provided with radio transmission means mounted on the hook block or elsewhere to transmit a signal to radio signal receiving means in the cab of the crane, the signal containing information enabling an operator to determine the weight of the load being lifted by the crane.

An alternative embodiment of the invention is shown which is easily mounted on already existing cranes with a minimum of time, expense and inconvenience.

BRIEF DESCRIPTION OF THE DRAWINGS

FIG. 1 is a side perspective view of a crane embodying a weight measuring hook block apparatus constructed in accord with the invention.

FIG. 2 is a front section view of the hook block of the crane taken in the direction of arrows 2—2 of FIG. 1.

FIG. 3 is a front sectional elevation view with components partially in phantom of a second embodiment of the invention which can be readily installed on already existing cranes.

DETAILED DESCRIPTION

Figure 4:
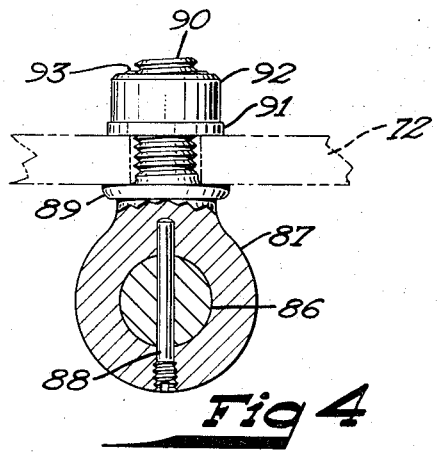
FIG. 4 is a cross sectional side view taken in the direction of arrows 4—4 in FIG. 3.
Figure 5:
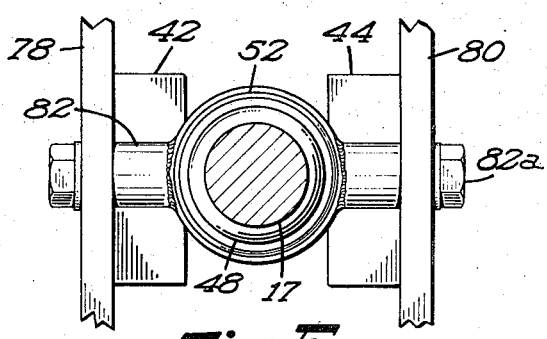
FIG. 5 is a bottom view taken in the direction of arrows 5—5 of FIG. 3.

Referring now to FIG. 1, a crane 12 has a boom 14 from which the weight measuring hook block apparatus 10 is suspended by a plurality of cables, a load 16 being suspended from hook 17. Operation of the crane 12 is accomplished from a cab 15.

Referring now to FIG. 2, the weight measuring hook block apparatus 10 has a hook block frame member 18, the frame member having side plates 20 and 22 rigidly interconnected by pulley guard 53, the pulley guard 53 and side plates 20 and 22 all made of steel or like material and collectively comprising the frame member 18. It should be understood that the frame member 18 illustrated herein is but one type of frame usable with the invention, and that various known or obvious alternative structures may be substituted, all such alternative structures being within the purview of the invention.

A substantially straight, longitudinal bar 26 has its ends 28 and 30 extending between the side plates 20 and 22 of frame member 18, the bar 26 being formed of strong substantially elastic material such as steel which is elastically deformable in response to loading forces applied thereto. The ends 28 and 30 of the bar 26 are retained in the side plates 20 and 22 respectively. In retaining the ends of the bar in the frame member 18, it is preferred that the bar be permitted to undergo small movements relative to side plates 20 and 22 so the bar 26 is not stressed or deformed by minor misalignment between itself and the frame member 18 and is more easily assembled with the frame member. Accordingly, it is preferred to permit the bar 26 to undergo small amounts of axial movement indicated by arrow 31 and rotational movement about the longitudinal central axis of the bar 26. This can be accomplished by mounting the bar 26 to the frame member 18 by pins passing through the side member and the bar 26. If the aperture through the bar 26 is slightly wider than the width of the pin, the bar will be able to undergo the small axial and rotational movements described. It has also been found desirable that the pin should pass through the bar 26 in a direction perpendicular to the plane of the drawing of FIG. 2 in order to create minimal distortion of the bar 26. The same mounting means may be used with the bar 84 in FIG. 3 described hereafter. Although the described mounting permitting small movement is preferred, it should be understood that the invention will function satisfactorily if the bar 26 is retained in frame member 28 by any means known to the art.

The bar 26 is provided with a shoulder 32 thereon, the shoulder being formed as either an integral part of the bar 26 or comprising a sleeve thereabout. Preferably the shoulder 32 is centered on the bar 26. The bar 26 and its shoulder 32 are of circular cross section and have a circular cross section sleeve 38 positioned therearound.

Strain gauges 34, 35, 36 and 37 are mounted on the surface of the bar 26, a pair being positioned on each side of the shoulder 32. The strain gauges constitute strain gauge measuring means to detect the compression and extension of the bar caused by bending deformation of the bar when forces are applied thereto. The positioning, number and functioning of these strain gauges will be discussed further hereafter. The volume between the inner periphery of the sleeve 38 and the surface of the bar 26 is filled with potting compound 33 such as epoxy or the like, which acts as a filler material to surround and protect the strain gauges positioned on the bar.

One or more pulley wheels such as wheels 39, 40 and 41 are rotatably mounted on the sleeve 38, bearings B being interposed between the pulley wheel and the outer periphery of the sleeve. The supporting cables of crane 12 encircle the pulley wheels 39, 40 and 41 to support the hook block apparatus 10. In the embodiment of the invention shown in FIG. 2, the sleeve 38 and one or more pulley wheels rotatably mounted on the sleeve 38 collectively comprise a force applying member located between the ends of the bar 26 and on the bar for the purpose of transmitting to the bar forces which are applied to the force applying member.

Compartments 42 and 44 are mounted to the frame member 18 adjacent the trunnion 24, the compartment 42 containing electrical circuitry which will be discussed in further detail hereafter, and the compartment 44 containing batteries for the supplying of energy to the circuitry in compartment 42. As will be appreciated by those skilled in the art, electrical wiring extends from the strain gauges 34, 35, 36 and 37 to the electrical circuitry in compartment 42, but such wiring has been omitted from FIG. 2 for simplification.

A load engaging device such as hook 17 is mounted to the frame 18 by passing the threaded end 49 of the hook through an aperture in the hook support block 24, thrust bearing 46 being positioned on the upper side of the block 24. A round nut 50 retained in position on end 49 by socket head set screws 51 permits the hook 17 to be rotated relative to the hook support block 24 but prevents the nut 50 from working loose. The ends of the block 24 fit within sockets in the frame 18 and are retained therein by its bolts 24a.

Although throughout this disclosure, the load engaging device is represented by hook 17, it should be understood that any known load engaging device may be substituted for the hook 17 and is within the purview of the invention. Accordingly the term load engaging device should be construed to include inter alia devices such as electromagnetic pickups for raising quantities of magnetic materials, earth digging apparatus, etc. In addition, it should be understood that the term crane as used herein refers to any mechanical device used for raising or lowering loads or moving loads about.

A radio antenna 52 encircles the shaft of the hook 17 and is attached to the bottom of the hook support block 24, the purpose of the antenna 52 being further described hereinafter.

A pulley guard 53 separates the rotating pulley wheels 39, 40 and 41 from the lower portion of the frame member 28 to which the compartments 42 and 44 are mounted.

Referring now to FIG. 3, a second embodiment 60 of the weight measuring hook block apparatus is shown, the embodiment 60 being intended for installation on already existing cranes. Most crane units have a hook block 62 on which one or more pulley wheels such as wheels 63, 64 and 65 are rotatably mounted on axle 66, the wheels being partially enclosed by pulley guard 67. The axle 66 extends between side plates 68 and 70 which are rigidly interconnected by trunnion 72. The trunnion 72 has a bore 74 therethrough, and in already existing cranes, the aperture 74 would contain the threaded end 49 of a hook 17 or the mounting for some other load engaging device as shown in FIG. 2. In order to install the embodiment 60 of the invention on the block 62, the hook would be removed from the hook block 62 by removing the nut which ordinarily retains such a hook in position and then attaching the hook block apparatus 60 in place of the hook as will be described hereafter.

The apparatus 60 has a hook block frame member 76 comprising side plates 78 and 80 rigidly joined to hook support block 82 by bolts 82a, the frame member 76 being made of materials having adequate strength to safely support the anticipated loads of the crane 12. A straight, longitudinal, elastically deformable bar 84 having the same structural characteristics as bar 26 in FIG. 2 is retained at its ends by the hook block frame member 76 in the same manner taught for bar 26 of FIG. 1. The bar 84 is provided with a shoulder 86 like shoulder 32 in FIG. 2, about which force applying member 87 is positioned, a threaded pin 88 passing through the member 87 and through bar 84 to retain the member 87 in position on the bar. The force applying member 87 may have an eye bolt configuration as shown in FIG. 4, the bolt 87 having a shoulder 89 and a threaded shaft 90 passing through the trunnion 72 and the thrust bearing 91 and retained by round nut 92, through which socket head set screws 93 are inserted to prevent accidental loosening of the nut. It has been found desirable to leave sufficient clearance between nut 92 and shoulder 89 to permit the member 87 to rotate relative to trunnion 72.

The bar 84 is provided with strain gauges 94, 95, 96, 97, 98, 99, 100 and 101 to sense the compression and extension of the bar caused by bending deformation of the bar 84 as will be further discussed hereafter. Circular cross section sleeves 102 and 103 encircle portions of the bar 84 to protect the strain gauges from physical damage. A potting compound 33 is inserted between the inner periphery of the sleeves 102 and 103 and the surface of the bar 84.

Every strain gauge on the bar 26 or 84 is spaced from the neutral axes of the bar, the neutral axes being the axes along which no longitudinal extension or compression of the bar occurs in response to forces applied in a given direction. In FIGS. 2 and 3 with the forces applied as shown in those figures, the neutral axes are defined by the intersections of the periphery of the bar 26 or 84 with a first plane passing through the central axis of the bar and perpendicular to a second plane, the second plane being defined by the central axis of the bar and force vector 105.

Strain gauge electrical connections leave the sleeves adjacent the force applying member 87 and lead to the compartment 42 in which electrical circuitry is contained. A second compartment 44 houses batteries. The crane's hook 17 is connected to the hook support block 82 in the same manner as that described for the hook 17 in FIG. 2, and accordingly will not be described further.

To detect deformation of either the bar 26 or 84, one or more strain gauges is needed. A single strain gauge positioned on the bar 26 at any location adapted to detect deformation caused by the forces 105 and 134 is acceptable to obtain a satisfactory indication of the load applied to the crane. A single strain gauge provides an acceptable approximation of the load applied to the bar 26 because there is little axial movement along the bar of the forces 105 and 134. In fact, there is some movement of these forces as the bar shifts somewhat in its mounting in frame 18, but the errors occasioned by such shifting are often small enough to ignore.

If two strain gauges are used on the bar 26, one gauge should be positioned to detect compression and the other to detect simultaneous extension caused by forces 105 and 134. For example, strain gauge 34 (FIG. 2) will detect extension and strain gauge 36 compression when forces 105 and 134 are applied to the bar 26. Two strain gauges positioned to detect the compression and extension occasioned by such loading of the bar and located generally in or near a plane defined by the central axis of the bar 26 and force vector 105 will be essentially unresponsive to sideward forces applied to the bar in a direction perpendicular to the plane of the drawing in FIG. 2 or to forces directed axially along bar 26. Accordingly, improved accuracy can be gained if two strain gauges rather than one are employed on the bar 26.

Further accuracy can be obtained by using two or more pairs of strain gauges on the bar 26. Two or more pairs of strain gauges can achieve all the benefits described for two strain gauges and have the further advantage of making the accuracy of the weighing apparatus independent of the location along the bar 26 or 84 at which the forces 105 and 134 are applied. As will be appreciated by those skilled in the art, a force applied to the bar 26 creates a force moment about a given strain gauge equal to the product of the force magnitude and its distance to the given strain gauge. Thus when a pair of strain gauges 34 and 35 are used on bar 26 of FIG. 2 and they are a distance d apart, and a force 105 is applied to the bar a distance D from gauge 34, then the moment of force 105 about gauge 34 is FD when the force 105 is represented by F correspondingly, the moment of force 105 about gauge 35 is $F(D-d)$.

The absolute difference between the moments at gauges 34 and 35 is $|FD - F(D-d)| = Fd$. This principle, which is referred to hereafter as the differential bending moment principle, indicates that when a pair of strain gauges is electrically connected to, in effect, subtract the force moment they measure, only the force magnitude and the distance between strain gauges is of importance. The position or positions on the bar at which the force or forces are applied is of no consequence. A more detailed analysis and discussion of the differential bending moment principle and the manner of making electrical connections of the strain gauges in electrical measuring circuitry are disclosed in copending U.S. Pat. application Ser. No. 373,790 filed June 26, 1973, and entitled Deformation Responsive Weighing Apparatus by Richard S. Bradley and said copending application is incorporated herein by reference.

While a single pair of strain gauges will effectively utilize the differential bending moment principle, it is helpful to have one pair of strain gauges on a surface which will be extended and a second pair of strain gauges on a surface which will be compressed when the bar is exposed to the anticipated loading condition. The construction of the strain gauges make them inherently more responsive to deformation from certain directions. The gauges are positioned on the bars 26 or 84 to be most sensitive to deformation caused by forces in direction 105. Such positioning permits use of the differential bending moment principle while also assuring that the strain gauges will be unresponsive to forces axially directed along the bar, twisting forces and forces directed perpendicular to the plane of the drawing in FIG. 2 and thus produces a highly accurate measurement. It is not essential that the two strain gauges making up each pair be the same distance apart, but if they are equally spaced the electrical measuring circuitry can be simplified. Accordingly, equal spacing between strain gauges is preferred.

Because as little as one strain gauge may be used effectively with the bar 26 or 84 or alternatively, additional strain gauges may be used therewith to advantage, the term strain gauge measuring means, as used herein, includes one or more strain gauges. Naturally, all the foregoing remarks pertain to either bar 26 or bar 84.

In FIG. 1, strain gauges 34 and 35 are attached on the surface of the bar 26 in side by side relationship, as are the gauges 36 and 37, the distance between gauges 34 and 35 being identical to that between gauges 36 and 37. Gauges 34 and 35 are positioned on an upper surface and gauges 36 and 37 on a lower surface of the bar so that one pair of gauges will detect compression and the other pair simultaneously detect extension when the bar is deformed by forces in directions 105. The identical spacing between the gauges is helpful if the measuring circuitry is to be reduced to simplest form. All gauges are positioned and substantially centered within a common plane defined by the force vectors 134 and 117. An electrical measuring bridge such as a Wheatstone bridge is used to determine the change in impedance of the strain gauges when loading deforms the bar 26. Circuitry useable for measuring the changes in resistance of these strain gauges and also a more detailed explanation of strain gauge behavior may be found in the copending application described earlier herein and incorporated by reference. When the forces 134 and 117 are applied to the bar 26, gauges 34 and 35 are compressed, decreasing their resistances, and gauges 36 and 34 undergo extension, increasing their resistances. These four strain gauges are connected in the Wheatstone bridge circuit represented by electrical measuring circuitry 107, as described in the copending application, such that extension of strain gauges 36 and 37 coupled with simultaneous compression of gauges 34 and 35, or vice versa, produces a voltage imbalance across the bridge which is directly proportional to the applied load on the bar 26. The desired mode of connection of the strain gauges in the bridge circuit also assures that no imbalance occurs across the bridge when all the gauges detect extension, or alternatively, all detect compression, because the electrical properties of every strain gauge change identically, and no unbalanced condition is produced. For example, when the bar 26 is deformed in a direction perpendicular to the plane of the drawing of FIG. 2 by any extraneous forces, the strain gauges are essentially unresponsive and do not change their resistances, resulting in no imbalance of the bridge. When bar 26 is twisted or undergoes axial compression or extension due to extraneous forces, the gauges are affected identically and the bridge circuit remains balanced. Accordingly, the bar 26 with the shown placement of strain gauges is highly responsive to forces in directions 105 and essentially unresponsive to the described extraneous forces in other directions. Use of two or more pairs of gauges has also been found desirable to increase the total resistance in the circuitry 105, to thereby limit the current drawn from the battery 116.

Referring now to FIG. 3, where four pairs of strain gauges are attached to the bar 84, all strain gauges are on or adjacent to a plane defined by parallel force vectors 136, 138, and 87 so that the system will be relatively unresponsive to extraneous forces. The distance between each two adjacent strain gauges, such as between gauges 94 and 95, 96 and 97, 98 and 99, and 100 and 101, is equal so that the measuring circuitry 107 can be simplified. Two pairs of strain gauges are mounted on the upper surface of the bar and two pairs on the lower surface so that the two pairs will simultaneously detect compression when the bar 84 is deformed in directions 105. The four pairs of gauges are connected in an electrical bridge circuit such as a Wheatstone bridge, such that an imbalance occurs across the bridge only when four gauges on the upper surface sense compression and the remaining four on the lower surface sense extension, the extended strain gauges increasing their impedances in substantially the same amount as the compressed gauges decrease their impedances. When all strain gauges are compressed or alternatively extended, no imbalance occurs across the bridge. Such bridge circuits and the manner of connecting the strain gauges are known to the art or described in the co-pending application and will not be discussed further here. As a result of such bridge circuit connections, the bridge circuit is unbalanced only when a force is applied to the bar 84 from directions 105. Extraneous forces which twist the bar or which act axially on the bar, or forces perpendicular to the plane of the drawing of FIG. 3 which act on the bar cause each strain gauge to change its impedance identically, and such change causes no imbalance in the bridge circuit. So long as no imbalance is detected, the bridge does not indicate any load on the bar 84. Accordingly, the bridge is only responsive to forces on the bar which have a component in directions 105.

Figure 6:
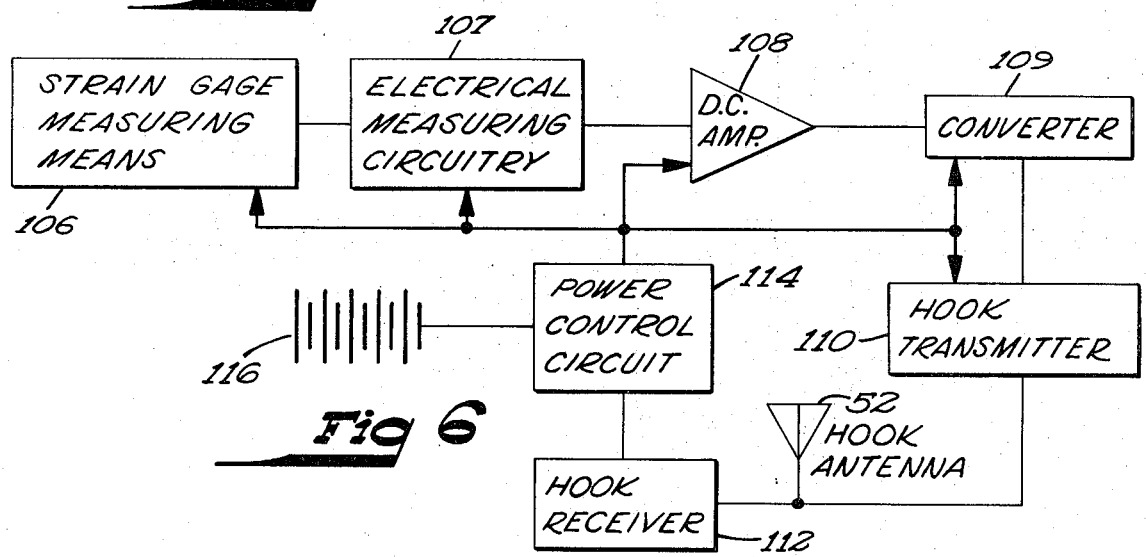
FIG. 6 is a schematic block diagram of certain of the electrical systems utilized with the weight measuring hook block apparatus.

Referring now to FIG. 6, the strain gauge measuring means 106 comprises the collection of strain gauges mounted on bar 26 or 84, although it should be understood that as little as one strain gauge may be used to obtain a load measurement. These strain gauges are interconnected in appropriate electrical measuring circuitry 107 which typically is a measuring bridge such as the described Wheatstone bridge or a like device in order to detect the changes in electrical properties of the strain gauges as the bar on which they are mounted is deformed. Electrical measuring circuitry 107 produces an output signal proportional to the deformation of the bar as measured by the strain gauge measuring means 106, this output signal being fed through the DC amplifier 108 to produce a larger amplitude signal. Converter 109 is an analog to digital converter and in response to a signal of given amplitude produces a predetermined plurality of electrical pulses. Accordingly, the larger or smaller the amplitude of the input signal to converter 109, the larger or smaller, respectively, is the number of output pulses from converter 109. Accordingly, the number of pulses produced by converter 109 provides a highly accurate indication of the extent of deformation of the bar. The first and last output pulses of converter 109 are delivered to a first radio transmission means in the form of transmitter 110 located on the hook block frame member and the first pulse triggers a radio signal generated by transmitter 110 which is transmitted by antenna 52 located on the trunnion 82 or 24. The first and last pulses have a time difference between them which is a direct function of the weight that is applied to the crane hook 17. The duration of the transmitted signal is thus indicative of the load applied to the hook. When the transmitter detects the last output pulse it ceases to transmit.

Because it is preferred that a signal is not continuously generated from the hook transmitter 110, control apparatus is provided to selectively activate the measuring circuitry 107, the amplifier 108, the converter 109 and the hook transmitter 110. This apparatus takes the form of a hook block receiver 112 which is coupled to antenna 52, and further includes power control circuit 114. Accordingly, when a command signal is transmitted from the crane cab 15 to the antenna 52 as will be described hereafter, the command signal is received by hook receiver 112 which actuates power control circuit 114, which in response energizes hook transmitter 110, converter 109, amplifier 108, and electrical measuring circuitry 107 and the strain gauge measuring means 106, supplying them with power from battery 116, actuating the components to transmit a radio signal from antenna 52 which contains information indicating the weight sensed by the strain gauge measuring means 106. All of the circuitry indicated in FIG. 6 is located on the hook block frame member, all of it being contained in compartment 42 aside from the antenna 52 and the strain gauge measuring means 106 which are mounted on the trunnion and the bar respectively.

Figure 7:
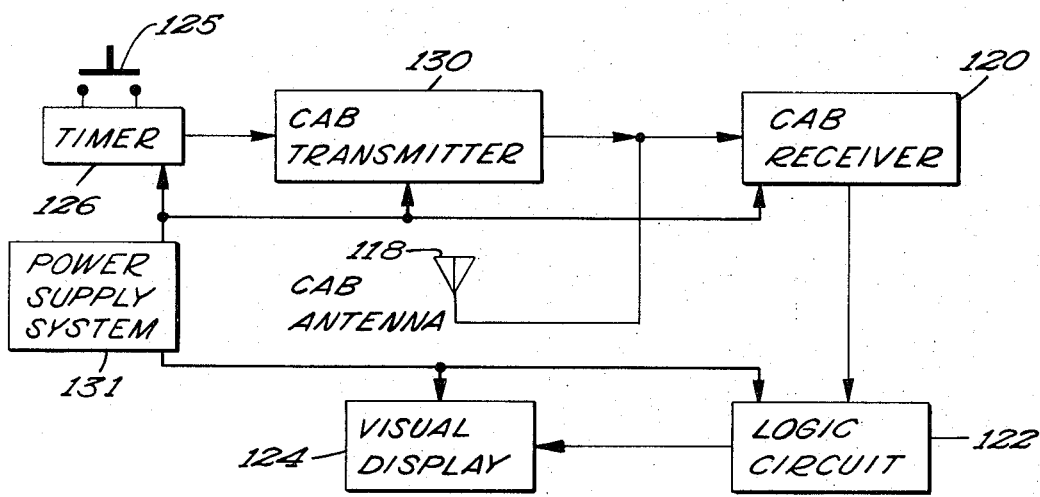
FIG. 7 is a schematic block diagram of the electrical systems utilized in the crane cab to send and receive radio signals to and from the hook block apparatus.

Refer now to FIG. 7, which shows the schematic block diagram indicating the components at the cab 15 which receive the radio signal from the hook block. A cab antenna 118 receives a radio signal from the antenna 52, the signal passing to the cab receiver 120, which constitutes a first radio signal receiving means, and thence to a logic circuit 122 which includes a clock, emitting pulses at the same precise rate that pulses are emitted from the converter 109 in the hook block assembly. The first received pulse from the receiver 20 gates on the clock pulses in the logic circuitry to a counter therein and the last received pulse from the receiver 120 gates off the pulses being emitted by the clock and the logic circuitry. The clock pulses received by the counter are counted and the weight signal is displayed representing the magnitude of the weight applied to the hook block. The output signal of the logic circuit 122 is fed to a visual display apparatus 124 which indicates the weight applied to the hook block. A timer circuit 126 has an energizing switch 125. When the timer 126 triggers the cab transmitter 130, the transmitter delivers a radio signal of short duration to the cab antenna 118. This signal is radiated from antenna 118 and received by the hook antenna 52 to actuate the power control circuit 114 which then energizes the hook transmitter 110, converter 109, amplifier 108, measuring circuitry 107 and strain gauge measuring means 106 to measure the load and transmit a radio signal indicating the weight of the load applied to the hook 17. The signal from the cab transmitter 130 is of short duration and terminates before a signal containing load information is transmitted by hook antenna 52 back to cab antenna 118. The radio signal from hook antenna 52 is received by the antenna 118 and delivered to the cab receiver 120 and the information signal then passed to logic circuit 122 which produces an output signal to the visual display apparatus 124 permitting the operator to determine immediately the weight applied to the hook block. A power supply system 131 which includes a battery delivers electrical power to the components 126, 130, 120, 122 and 124.

In operation, the weight measuring hook block apparatus 10 is installed on a crane 12, the supporting cables from the crane passing about the pulley wheels 39, 40, and 41 to suspend the hook block apparatus from the boom 14 of the crane. It should be understood that a greater or lesser number of pulley wheels can be used and the width of the hook block apparatus increased or decreased accordingly where heavier or lighter loads are to be encountered. The load 16 is connected to the hook 17 and the operator in cab 15 actuates the crane to raise the hook block apparatus 10 so as to lift the load slightly off the ground. As the load 16 clears the ground, the weight of the load is applied to the ends 28 and 30 of the bar 26 by the hook block frame member 19, the force vectors being indicated by arrows 134 (FIG. 2). Application of downward forces 134 causes the pulley wheels 39, 40 and 41 to exert a reaction force on the sleeve 38 which is applied to the bar 26 by force vector 117 at the shoulder 32. The combination of downward forces 134 and reaction force 117 causes the bar 26 to be deformed from its initially straight condition, the extent of deformation being directly proportional to the magnitude of the weight of load 16 applied to hook 17. When an operator in the cab 15 of crane 12 wants to know the weight of the load 16 applied to the hook 17 the operator closes switch 124 actuating timer 126 (FIG. 7); the timer 126 turns on the cab radio transmitter 130 for a brief interval, producing a command radio signal which is transmitted by the cab antenna 118 to the hook antenna 52. As the command signal is received by the antenna 52 it is fed to the hook receiver 112 and thence to power control circuit 114. On receiving the command signal, the power control circuit energizes electrical measuring circuitry 107, strain gauge measuring means 106, amplifier 108, converter 109, and hook transmitter 110, supplying power to these components from battery 116. As the recited components are turned on, the deformation of bar 26 is sensed by the strain gauges 34, 35, 36 and 37 which collectively serve as strain gauge measuring means 106. The change in electrical properties of the measuring means 106 is measured by electrical measuring circuitry 107 and an output signal from the circuitry 107, proportional to the weight applied to hook 17, is delivered to amplifier 108 from which an amplified signal is fed through digital converter 109. The converter 109 generates a number of pulses determined by the magnitude of the input signal received by it. The first pulse from converter 109 turns on the transmitter 110, and the last pulse from the converter 109 turns it off. While on, the transmitter 110 delivers radio signals to the antenna 52 for transmission.

Referring again to FIG. 7, the timer 126 actuates the cab transmitter 130 for only a brief interval which will have expired by the time hook transmitter 110 transmits a signal to the cab antenna 118. Consequently, cab antenna 118 is ready to receive the radio signal from the hook antenna 52 and the signal is fed to cab receiver 120, the first received signal actuating the clock in logic circuit 122 and applying the clock's pulses to a counter. The counter counts the pulses until the hook transmitter 110 ceases transmission, at which point the last received signal to the logic circuit 122 interrupts the clock pulses to the counter. The number of pulses counted at the time of interruption is accurately representative of the load applied to the crane. The information is then delivered from the logic circuit 122 to visual display apparatus 124 to indicate the load to the operator.

Although FIG. 2 shows the load 17 being applied to the frame member 18, with the result that the load forces are applied to the bar 26 at the ends 28 and 30 thereof, it should be understood that if desired, the transducer 10 can be constructed so that the load 16 is applied to the bar at shoulder 32. In such an event, the crane would support the ends of the bar 28 and 30, the frame member 18 being modified appropriately to be directly supported by the crane. In such a configuration the hook or similar load engaging device would be supported by the bar 26. Accordingly, it should be understood that such a modified configuration is within the purview of the invention.

Referring now to FIG. 3, when the weight measuring hook block apparatus 76 is to be utilized on an already existing crane having a hook block 62, one first removes the hook 17 from the hook block 62, leaving aperture 74 open. Shaft 90 of the apparatus 76 is inserted in aperture 74, the shoulder 89 being adjacent the trunnion 72 and the shaft 90 being rotatably retained in the trunnion by nut 93 threaded onto shaft 90 over thrust bearing 91. The nut 92 is retained on shaft 90 by set screws 93. The weight measuring hook block apparatus 76 is now rotatably mounted to the old hook block 62 and is substantially ready for operation as soon as the radio and readout equipment shown in FIG. 7 is installed in the cab 15 of the crane. The rotatability of shaft 90 in trunnion 72 and like rotatability of hook 17 in hook support block 82 substantially reduce the generation of twisting forces which might otherwise be applied to the bar 84, thus improving accuracy of the device.

When a load is applied to the hook 17 (FIG. 3), the force is transmitted through the hook support block 82 to the side plates 78 and 80 of hook block frame member 60 which in turn transmit the forces 136 and 138 to the ends of the bar 84. Application of forces 138 and 136 causes a reaction force 140 to be applied to the shoulder of the bar 84 by the force applying member 87. Accordingly the forces 140, 136 and 138 cause the bar 84 to be deformed in proportion to the weight of the load applied to hook 17.

Accordingly, strain gauges 94, 95, 96, 97, 98, 99, 100, and 101, which constitute strain gauge measuring means 106, sense the deformation of the bar 84 and change their electrical properties accordingly. These changes in electrical properties are measured by electrical measuring circuitry 107 and thereafter the electrical circuitry shown in FIGS. 6 and 7 functions identically to the operation already described for the apparatus shown in FIG. 2.

It should be understood that although in FIG. 3 the forces of the load are applied to the ends of the bar 84 and the reaction force to the shoulder of the bar, the transducer can as readily be constructed and arranged to have the load forces applied to the shoulder of the bar and the reaction forces to the ends of the bar, and such arrangement is within the purview of the invention.

Accordingly, an operator in the cab 15 can by simply actuating switch 125 (FIG. 7) cause the measuring apparatus 10 or 76 to transmit a radio signal to equipment in his cab giving him an immediate indication of the weight of the load 16 carried by the hook 17. If the indicated weight is too large for the crane he can take immediate steps to lighten it and accordingly the danger of accident is greatly reduced.

While the preferred embodiments of the present invention have been described, it should be understood that various changes, adaptations and modifications may be made therein without departing from the spirit of the invention and the scope of the appended claims.

What is claimed is:

1. A weight measuring hook block apparatus for cranes attachable between a load engaging device and the crane comprising:
   a substantially straight, longitudinal bar elastically deformable in response to loading forces applied thereto;
   a hook block frame member retaining the ends of said bar;
   a force applying member between the ends of said bar and on said bar to transmit to the bar forces which are applied to said force applying member;
   one of said members being carried by the crane and the remaining member constructed and arranged to carry the load engaging device so that a load applied to one of said members causes the remaining member to exert reaction force on said bar to deform said bar elastically;
   strain gauge measuring means operatively mounted on said bar to detect bending deformation of said bar caused by force applied to said bar by said members and thereby provide a measurable response indicating the weight of the load carried by the load engaging device; and
   electrical measuring circuitry operatively connected to said strain gauge measuring means to generate an output signal indicative of the weight of the load applied to the load engaging device.

2. The combination according to claim 1 wherein said hook block frame member is carried by said crane and said force applying member is arranged to carry the load.

3. The combination according to claim 1 wherein said force applying member is carried by said crane and said hook block frame member is arranged to carry the load.

4. The combination according to claim 1 wherein said hook block frame member is rotatably coupled to the hook block.

5. The invention according to claim 1 wherein said strain gauge measuring means includes two pairs of strain gauges, one pair of said strain gauges being positioned on said bar to detect compression of said bar and the remaining pair of strain gauges being positioned on said bar to detect extension of said bar when said bar is deformed by a load.

6. The invention according to claim 1 wherein said strain gauge measuring means includes a pair of strain gauges, one strain gauge positioned on said bar to detect compression of said bar and the remaining gauge positioned on said bar to detect extension of said bar when the said bar is deformed by a load.

7. The weight measuring hook block apparatus of claim 1 wherein said strain gauge measuring means is spaced from the neutral axes of said bar.

8. The combination according to claim 1 wherein said bar is of round cross section and includes a shoulder thereon, said shoulder receiving substantial force from said force applying member.

9. The combination according to claim 8 wherein said shoulder is substantially centered between the ends of said bar.

10. The combination according to claim 1 wherein said force applying member includes a rigid sleeve encircling the periphery of the bar and supported on said shoulder to apply force to said shoulder.

11. The combination according to claim 10 wherein said force applying member further includes pulley means rotatably mounted on said sleeve, said sleeve and said bar serving as an axle for said pulley means.

12. The combination according to claim 1 wherein said force applying member is substantially centered on said bar and has a shaft extending outwardly from said bar, said shaft being carried by the crane.

13. The combination according to claim 12 wherein said force applying member is rotatably mounted to said crane.

14. The combination according to claim 1 wherein said strain gauge measuring means includes four pairs of strain gauges, the gauges of each of said four pairs being equally spaced and two pairs being mounted to said bar to detect compression while the remaining two pairs, simultaneously with said compression detecting pairs, detect extension when said members deform said bar.

15. The combination according to claim 14 wherein said pairs of strain gauges are centered on a common substantially upright plane passing through said bar.

16. The combination according to claim 14 and further including electrical measuring circuitry operatively connected to said pairs of strain gauges to produce a measurable indication proportional to deformation of said bar when two pairs of gauges detect compression deformation of the bar and the remaining two pairs simultaneously detect extension deformation and to be substantially unresponsive when all pairs of strain gauges detect substantially identical deformation.

17. A weight measuring hook block apparatus for cranes attachable between a load engaging device and the crane comprising:
- a substantially straight, longitudinal bar elastically deformable in response to loading forces applied thereto;
- a hook block frame member retaining the ends of said bar;
- a force applying member between the ends of said bar and on said bar to transmit to the bar forces which are applied to said force applying member;
- one of said members being carried by the crane and the remaining member constructed and arranged to carry the load engaging device so that a load applied to one of said members causes the remaining member to exert reaction force on said bar to deform said bar elastically;
- strain gauge measuring means operatively mounted on said bar to detect deformation of said bar caused by force applied to said bar by said members and thereby provide a measurable response indicating the weight of the load carried by the load engaging device;
- electrical measuring circuitry operatively connected to said strain gauge measuring means to generate an output signal indicative of the weight of the load applied to the load engaging device; and
- first radio transmission means operatively connected to accept an output signal of said electrical measuring circuitry and generate a first radio signal containing information indicating the weight of the load applied to the load engaging device.

18. The combination according to claim 17 wherein said first radio transmission means includes an analog-to-digital converter to convert the output signal of the electrical measuring circuitry to a converted signal containing a plurality of pulses representative of the weight applied to the load engaging device.

19. The combination according to claim 17 wherein said first radio transmission means and said electrical measuring circuitry are mounted on said hook block frame member.

20. The combination according to claim 17 and further including an antenna operatively mounted on said hook block frame member.

21. The combination according to claim 17 and further including first radio signal receiving means mounted in the cab of the crane for receiving said first radio signal from said first radio transmission means.

22. The combination according to claim 21 and further including control apparatus in the cab for selectively actuating said first radio transmission means and said electrical measuring circuitry to transmit said first radio signal to said first radio signal receiving means in the cab.

* * * * *